United States Patent
Ratnaparkhi et al.

(10) Patent No.: US 10,120,955 B2
(45) Date of Patent: Nov. 6, 2018

(54) STATE TRACKING OVER MACHINE-LEARNED RELATIONAL TREES IN A DIALOG SYSTEM

(71) Applicant: Nuance Communications, Inc., Burlington, MA (US)

(72) Inventors: Adwait Ratnaparkhi, San Jose, CA (US); Benjamin Birch Douglas, San Francisco, CA (US); William Lawrence Jarrold, San Francisco, CA (US); Deepak Ramachandran, Mountain View, CA (US); Peter Zei-chan Yeh, San Jose, CA (US)

(73) Assignee: Nuance Communications, Inc., Burlington, MA (US)

( * ) Notice: Subject to any disclaimer, the term of this patent is extended or adjusted under 35 U.S.C. 154(b) by 646 days.

(21) Appl. No.: 14/677,246

(22) Filed: Apr. 2, 2015

(65) Prior Publication Data
US 2016/0019290 A1    Jan. 21, 2016

Related U.S. Application Data

(60) Provisional application No. 62/026,405, filed on Jul. 18, 2014.

(51) Int. Cl.
*G06F 17/30*    (2006.01)

(52) U.S. Cl.
CPC .. *G06F 17/30958* (2013.01); *G06F 17/30654* (2013.01)

(58) Field of Classification Search
None
See application file for complete search history.

(56) References Cited

U.S. PATENT DOCUMENTS

| | | | |
|---|---|---|---|
| 2014/0172899 A1* | 6/2014 | Hakkani-Tur .... | G06F 17/30522 707/759 |
| 2015/0370787 A1* | 12/2015 | Akbacak ............. | G06F 17/2836 704/2 |

* cited by examiner

*Primary Examiner* — Anh Tai Tran
(74) *Attorney, Agent, or Firm* — Banner & Witcoff, Ltd.

(57) ABSTRACT

A method is provided for representing and updating the state of a dialog involving a series of queries and commands to an artificial intelligence system. Each statement within the dialogue may be modeled as a relational tree spanning nodes corresponding to named entities within the statement. A data structure may be used to store each of these trees and to modify them as the dialog progresses. A subsequent statement in the dialog may be parsed and its contents used to update an ongoing search initiated within that dialog. Statements may be used for the update process despite being fragmentary or not corresponding to any predetermined grammar. An algorithm is disclosed for updating the trees within the data structure after a new statement is parsed.

20 Claims, 5 Drawing Sheets

STATE TRACKING OVER MACHINE-LEARNED RELATIONAL TREES IN A DIALOG SYSTEM

CROSS REFERENCE TO RELATED CASES

This application claims priority to provisional application Ser. No. 62/026,405, filed Jul. 18, 2014, entitled "State Tracking Over Machine-Learned Relational Trees in a Dialog System," herein incorporated by reference in its entirety for all purposes.

FIELD

Aspects described herein generally relate to computational linguistics. More specifically, aspects provide methods for implementing user interfaces capable of processing complex user statements in natural languages.

BACKGROUND

Artificial intelligence systems play an important role in commerce by allowing users to receive information or assistance from a human-like avatar without the need to hire an actual human representative to communicate with the user.

Voice-based interfaces exist for accessing and controlling underlying software, allowing the user to issue natural language commands instead of using an input device to manipulate user interface elements such as menus, buttons, or other widgets. For example, many mobile smartphones provide a function for speaking to the phone in order to perform queries ("Siri, what is the capital of France?") or commands ("Call Jim.").

Other interfaces allow a user to input text and exchange instant messages in a chat with an AI system. For example, an online merchant or web hosting service may reduce load on customer service representatives by having a first-tier of support in which a customer describes his or her problem to a virtual helper ("I'm having trouble finding products X98 and X99 on your website.").

When a user inputs a command or query, the software underlying most existing systems only parses the input statement in order to determine a set of named entities within the statement. In the previous examples, the sets of named entities might be {"capital", "France"}, {"call", "Jim"}, and {"X98", "X99", "website"}.

Users may wish to express a complex query or command—for example, one that implies Boolean algebra, such as "I want to watch a film starring Robert Downey Jr., but not Ben Stiller." Parsing this input into a set of named entities results in the set {"film", "Robert Downey Jr.", "Ben Stiller"}. A system using only this set of entities to perform a query on an existing database will be unable to return results consistent with the user's intent, because the distinction between the actors in the user's original input has been lost.

Users may find an interface more natural and human-like if they are able to carry on a dialog through the interface, asking a series of questions or issuing a series of commands and receiving responses from the system in the same format. Dialogs present a unique set of challenges for an artificial intelligence program interpreting the input, as the current topic of the dialog can repeatedly change, or the meaning of a statement may be ambiguous without knowledge of the current context or consideration of a previous statement.

Existing systems are unable to dynamically track the state of a dialog containing many statements and replies. Each statement is examined in isolation, and existing systems cache or delete previous statements in the dialog if the user makes a statement that begins a new query or command. If a user states "I want to watch a movie with Robert Downey Jr.", a system might reply "Would you like to watch Tropic Thunder?" The user might then ask "Who directed Tropic Thunder?" This second query becomes the only active query, and the system ceases responding to the original query. After the second query is performed and answered, the user must repeat the original query or issue some other command to go back to learning about Downey's filmography.

Existing systems require the user to submit each query in a single statement, and this statement must generally conform to some expected pattern. The user query "I want to watch a movie with Robert Downey Jr." might return the response "Would you like to watch Tropic Thunder?" The user might then reply "One without Ben Stiller." Existing systems cannot process a second, fragmentary statement that is, when parsed in isolation, neither a query nor a command. The user's command "One without Ben Stiller" might return an error, or a list of all movies not starring Ben Stiller, or even all movies starring Ben Stiller, in that statement, while ignoring possible logical or semantic relationships between those entities and entities named earlier within the dialogue. Existing systems are unable to connect new entities to entities from previous statements with logical or semantic relationships.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to a method for tracking the context and informational content of an evolving dialog, updating the dialog state in response to new statements, and complying with a series of user requests, queries, or commands.

A first aspect described herein provides a method of modeling each user statement as a relational tree. A relational tree may comprise a node corresponding to each named entity, as well as logical or semantic relationships between those named entities.

A second aspect described herein provides a method of tracking an entire dialog context over time by storing relational trees in a stack data structure.

A third aspect described herein provides a method of modifying stored relational trees in response to subsequent statements within a dialog to reflect the user's new intent.

A fourth aspect described herein provides a method for resolving a user's queries and commands accurately within a dynamic dialog that may comprise many changes of subject or sub-queries.

Other details and features will be described in the sections which follow.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
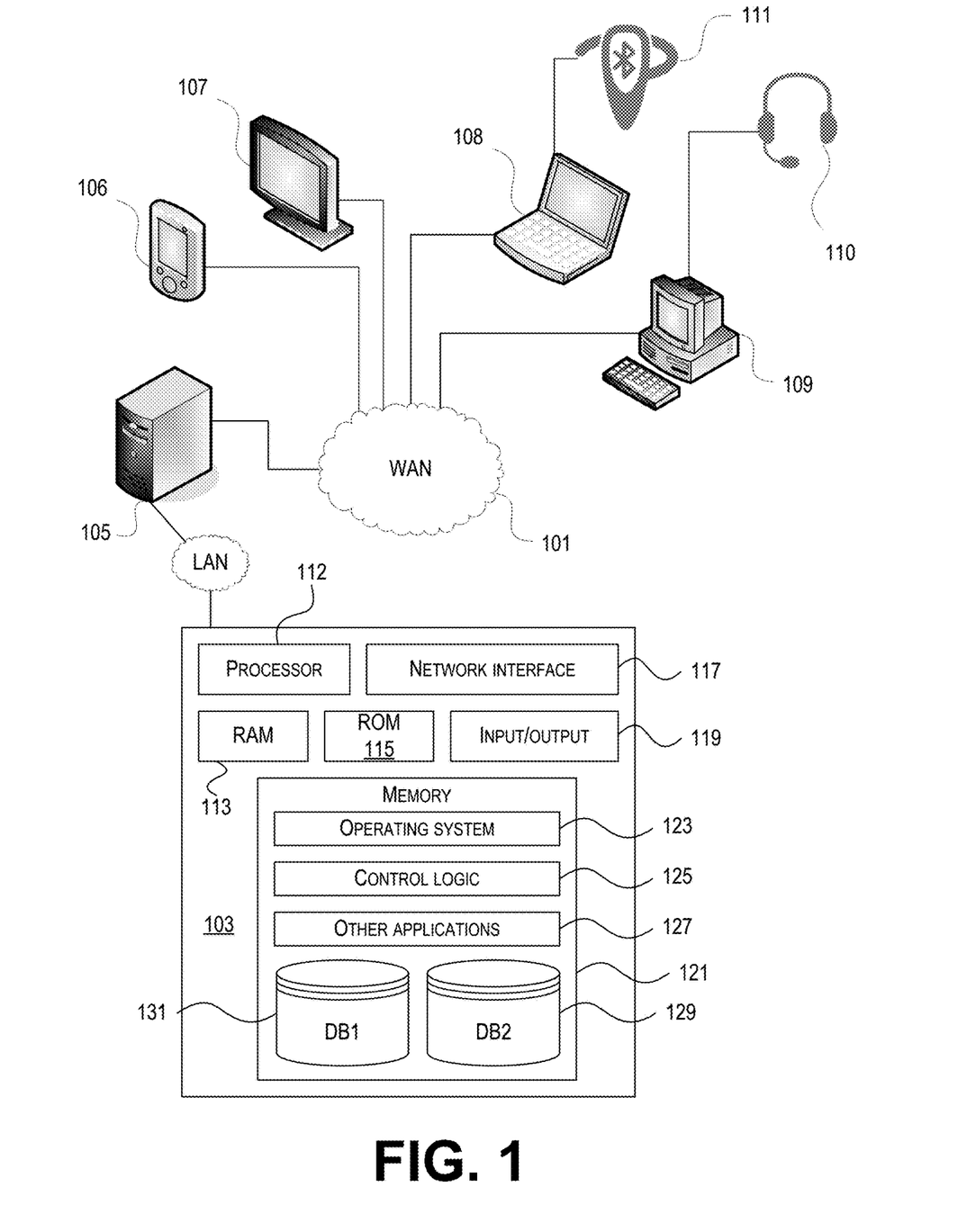
FIG. 1 shows an illustrative system comprising a number of network nodes which communicate with each other in order to provide a natural language user interface.

FIG. 1 illustrates one example of a network architecture and data processing device that may be used to implement one or more illustrative aspects described herein. Various network nodes 105, 106, 107, 108, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 105, 106, 107, 108, 109, and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 106, 107, 108, and 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 106, 107, 108, 109, e.g., using a web browser to connect to the data server 103 via one or more externally exposed web sites hosted by web server 105. Client computers 106, 107, 108, 109 may be used in concert with data server 103 to access data stored therein, or may be used for other purposes. For example, from client device 108 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 106, 107, 108, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 106, 107, 108, 109 may have similar or different architecture as described with respect to device 103. Those of skill in the art will appreciate that the functionality of data processing device 103 (or device 105, 106, 107, 108, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python or Ruby. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
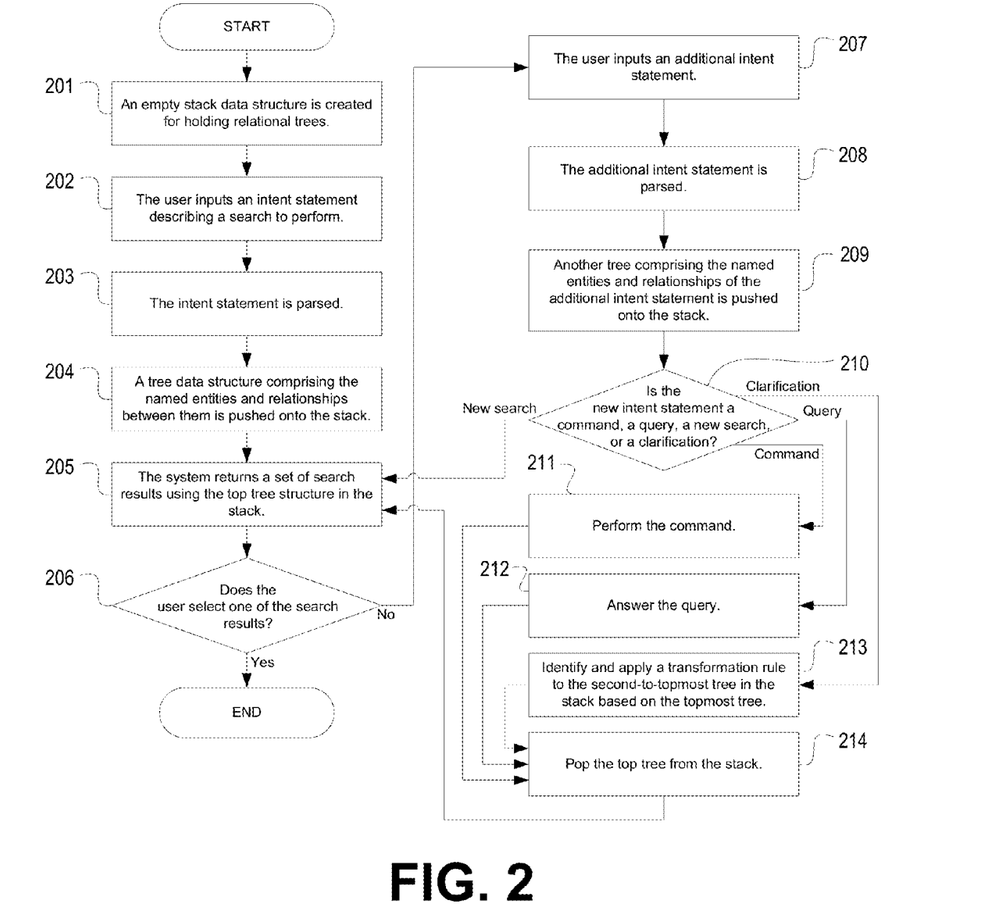
FIG. 2 shows an illustrative method for tracking a changing dialog state in response to sequential user input statements.

FIG. 2 shows an illustrative method via which user statements which comprise a dialog can be processed sequentially in order to track the changing dialog state and fulfill the user's changing intent throughout the duration of the dialog.

At the beginning of a dialog, in step 201, an empty stack (i.e., a last-in, first-out ordered data structure) may be created in the computer-readable memory in which the state of the dialog will be stored. The memory storing the stack may be located within server 103, server 105, computing device 106, 107, 108 or 109, or any other computing device connected to the system.

In step 202, the user may input a first intent statement. This intent statement may be typed or otherwise entered as digital text, or may be spoken audio which may be recorded by a microphone (such as those found in mobile phone 106, headset 110, Bluetooth earpiece 111, or any other recording device) and subsequently transcribed to text, or may be entered via any other input method which is capable of creating text comprising a statement in a natural language.

In step 203, the intent statement may be parsed by a parser (see also FIG. 3) to generate a tree describing the contents of the input statement. The tree may have a set of nodes corresponding to the set of named entities identified in the input statement by the parser, and a set of connections between nodes corresponding to the logical or semantic relationships between those nodes. The tree may also contain additional nodes which do not correspond to any entity within the input statement. For example, if the user statement consists only of "Tom Cruise," both a node for "Tom Cruise," as well as one for "program" to connect to the "Tom Cruise" node, may be created, representing "programs with Tom Cruise." In another example, a node may be created to represent the Boolean "or" and logically connected to two other nodes. In step 204, the tree may then be placed on the stack to be stored in memory.

In step 205, a computing device with access to the memory containing the stack (whether by virtue of executing on the same device, or having the ability to access the memory on another device via an API call or network request, or via any other means) may execute instructions to examine the top tree in the stack. The named entities and relationships in that tree may be used to perform a query on a database (which may be stored on the same device, on server 103, on a publicly available server on the internet controlled by a third party, or on any other device) to determine a set of results which may satisfy all or some constraints determined from the input statement. These results, a subset of these results, or a single first result may be communicated via output to the user. The output may take the form of displayed text, synthesized speech audio, an image, or any other output format comprehensible by the user.

In step 206, the user might indicate that the user's intent has been satisfied, terminating the dialog and causing the system to remain idle until another dialog with the system commences. The user might not indicate that the user's intent has been satisfied, and instead input an additional statement in step 207. The additional intent statement may be treated in similar fashion to the first intent statement; it may be parsed (step 208) and a tree comprising the named entities and their logical relationships may be created. This tree may be pushed onto the stack, becoming the new top tree in the stack.

In step 210, the new intent statement may be classified as a particular type of statement, such as a command, a query, a search, or a clarification. This list is non-exhaustive and may be extended to comprise any number of other classifications for a statement's use within the system.

A command may indicate the user's intent that the system perform an action that does not relate to the previous search. For example, after beginning a search while using television 107, the user might state "Increase volume.", "Show menu.", or "Go to Channel 15." A command might not have any output other than compliance with the command by the system in step 211. After the command has been performed, in step 214, the system may pop the tree representing the command from the stack, returning to the previous search results and outputting them to the user in step 205 to allow a selection.

A query may be a single question with a definitive answer, which may or may not relate to the previous search. In step 212, the system may output the response to the query. For example, after beginning a search by stating "I want to watch a Sean Connery movie." and receiving the response "How about Dr. No?", the user may ask "What is the running time of Dr. No?" The system may then output "One hour, forty-nine minutes." After the query has been answered, in step 214, the system may pop the tree representing the query from the stack, returning to the previous search results and outputting them to the user in step 205 to allow a selection.

A user query may be insoluble without examining the context of earlier statements in the dialog. In the previous example, the user may ask instead "How long is that movie?" Although a well-formed query, that statement alone may have no answer without being able to identify the antecedent to which "that movie" refers. The system may search for a suitable antecedent in the tree below the top tree in the stack and use it to resolve ambiguity in the query. The system may then be able to output "One hour, forty-nine minutes." After the query has been answered, in step 214, the system may pop the tree representing the query from the stack, returning to the previous search results and outputting them to the user in step 205 to allow a selection.

A query may be a fragment that is not well-formed in a given syntax. The user may ask instead, "Length?" The system may infer that the statement is not a command and determine a most suitable query type to match the statement. The system may then use the method described above to find within a previous tree any antecedents necessary to answer the query. The system may then be able to output "One hour, forty-nine minutes." After the query has been answered, in step 214, the system may pop the tree representing the query from the stack, returning to the previous search results and outputting them to the user in step 205 to allow a selection.

A query may have no relation whatsoever to a previous search. The user may instead decide to ask "Who directed Star Wars?" The system may nevertheless answer the query (by outputting "George Lucas."), pop the tree representing the query from the stack, and return to the previous search results and outputting them to the user in step 205 to allow a selection.

An additional user statement may be an entirely new search unrelated to the original search. After the system outputs a search result such as "How about Dr. No?", the user may state, "Nevermind. I want to watch a movie with Alec Guinness." The system may immediately return to step 205 and output results to the new search. In step 206, the user may select one of these new results and the dialog may be terminated. Alternatively, the user may input yet another intent statement, repeating the process of steps 207 through 210 with the newest search available to act as a context for resolving ambiguities in queries.

A clarification may be a fragment which further constrains the most recent search. For example, the user may state "I want to watch a Sean Connery movie." and receive the response "How about Dr. No?" The user may then respond "Not a James Bond movie." In step 213, the tree representing the clarification may be used to modify the search tree below it in the stack, adding one or more additional nodes and relationships to the search tree. In step 214, the top tree, representing the clarification, may be removed from the stack. The second-to-topmost tree, now modified, is used in step 205 to return a new set of search results, one of which the user may select or in response to which the user may input another intent statement.

A clarification may be a fragment which replaces a constraint within the most recent search. For example, the user may state "I want to watch a Sean Connery movie." and receive the response "How about Dr. No?" The user may then respond "An Alec Guinness one instead." In step 213, the tree representing the clarification may be used to modify the tree below it in the stack, replacing a node in the search tree with a node from the clarification tree. In step 214, the top tree, representing the clarification, may be removed from the stack. The second-to-topmost tree, now modified, may be used in step 205 to return a new set of search results, one of which the user may select, or in response to which the user may input another intent statement.

Steps 205 through 214 may be repeated any number of times as the user continues to input statements for processing by the system, until the user selects a search result and terminates the process.

Figure 3:
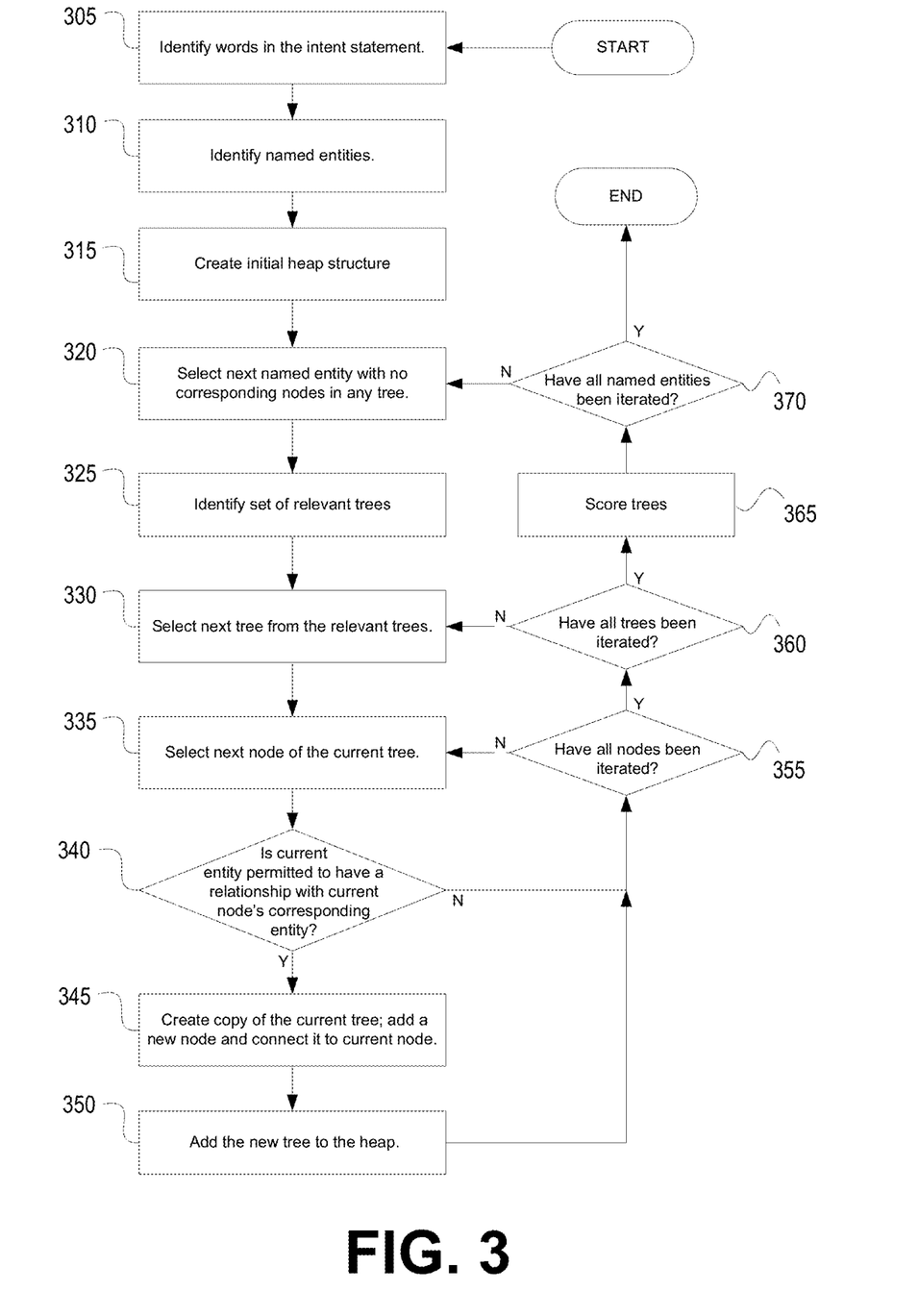
FIG. 3 shows an illustrative algorithm for parsing an input statement in order to generate a relational tree comprising named entities.

FIG. 3 describes an illustrative algorithm for parsing an input statement in order to generate a tree for use in steps 205, 209, and 213.

In step 305, the boundaries between words may be determined in order to divide the input statement into a series of entities, where an entity may comprise one or more words. In previous examples, "Sean Connery", "Dr. No", and "running time" may be recognized as single entities, the presence of whitespace characters notwithstanding. Entities may be recognized from matches in a predetermined list, vocabulary, or dictionary, inferred from what remains after a syntactic parser has recognized words neighboring the entity within the statement, or determined by any other means.

In step 310, the recognized entities may be classified as named entities. Named entities may be persons, characters, titles, genres, adjectives, time periods, dates, role descriptions, types of entertainment, Boolean operators, or any other pieces of information which may be used to categorize or describe items within a database. Some entities, such as articles, adverbs, or prepositions, for example, might not be classified as named entities.

In step 315, a heap structure may be created to track the K highest-scoring candidates for a tree structure, for some integer K. In some embodiments, K may take the value 1, the value 3, or any other number desired. The heap structure is initially empty, and a single tree with a default root node and a default score may be added to it.

In step 320, one of the named entities may be selected. Every time step 320 is subsequently repeated, a different entity may be selected.

In step 325, the K highest-scoring trees in the heap, or all trees in the heap if there are fewer than K trees, may be selected, and the remaining trees may be discarded.

In step 330, one of the highest-scoring trees may be selected. Every time step 330 is subsequently repeated, a different tree may be selected.

In step 335, one of the nodes in the selected tree may be selected. Every time step 335 is subsequently repeated, a different node may be selected.

In step 340, the system may determine whether a relationship between the currently selected named entity and the named entity corresponding to the currently selected node is permissible. Rules for determining permissibility of a relation may be predetermined and entered into the system.

For example, any named entity may have a relationship with the default node from the initially created tree. Any person may have a relationship with a title (indicating that a person played a role in that titled work), and any titled work may have a relationship with a date (indicating that the titled work is available for viewing on that date), but relationships between a person and a date may be determined to lack semantic meaning, and may be ruled impermissible.

In step 345, after a permissible relationship is identified between a node and a named entity, the system creates a copy of the current tree, creates a new node corresponding to the current named entity, and adds the new node to the new tree copy with a connection to the current node in that tree. In step 350, the new tree copy is added to the heap.

Further refinements may minimize the number of trees added to the heap by placing other restrictions on when a new node may be added to a new tree. For example, instead of adding all permissible relationships to copies of trees, a function may be used to estimate the probability of a relationship existing. A new tree comprising a new node may then be created only if the function returns a value above a given predetermined threshold. A chosen threshold probability could be approximately 0.05, or any other value between 0 and 1, inclusive, in response to the needs of a particular application.

In step 355, it may be determined whether all nodes in the current tree have been iterated and processed. If all nodes have not, steps 335 through 355 may be repeated until each node of the current tree has been selected. After all nodes have been processed, step 360 may be performed.

In step 360, it may be determined whether all K trees have been iterated and processed. If all trees have not, steps 330 through 360 may be repeated until each tree has been selected. After all trees have been processed, step 365 may be performed.

In step 365, a scoring function may be used to score every tree in the heap. A possible chosen function could estimate the probability of each relationship within the tree and give each tree a score equal to the product of multiplying each of the set of probabilities. After all trees have been scored, step 370 may be performed.

In step 370, it may be determined whether all the named entities have been iterated and processed. If all named entities have not, steps 320 through 370 may be repeated until each named entity has been selected. After all named entities have been processed, the algorithm may end. The highest-scoring tree may then be used in steps 205 and 209 to perform searches, perform queries, update other trees, or for any other purpose.

Figure 4:
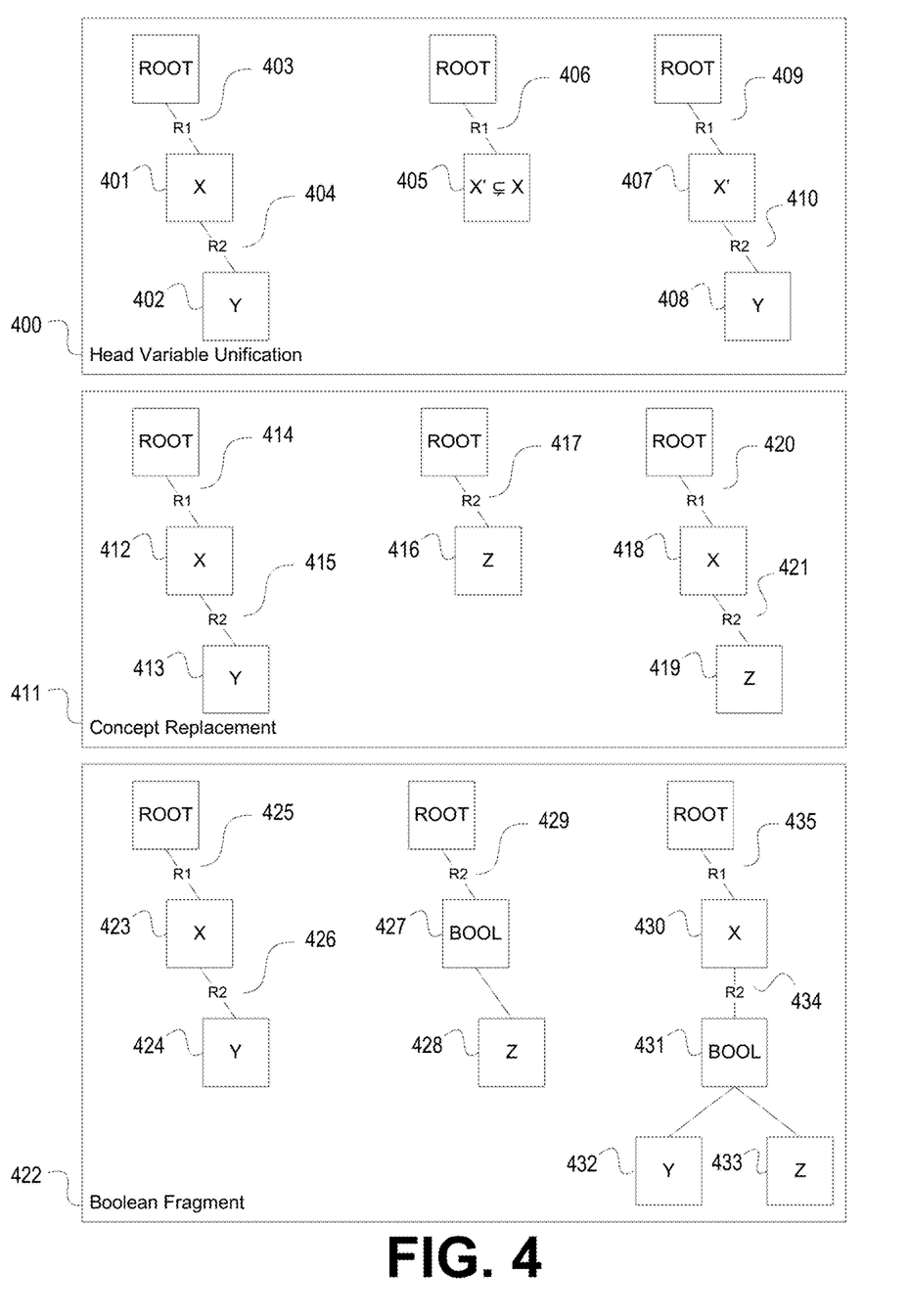
FIG. 4 shows illustrative rules for updating relational trees in response to user inputs during the dialog.

FIG. 4 describes illustrative rules for updating relational trees in response to user inputs during the dialog.

Rule 400 describes the process of head variable unification. There may be a first tree representing an earlier statement, containing relationship 403 between the root and entity 401, and relationship 404 between entity 401 and entity 402. A second tree may have relationship 406 between the root and entity 405. If relationships 403 and 406 are of the same type, and entity 405 is strictly a subset of entity 401, a new tree is created which is identical to the first tree except that entity 401 has been replaced by entity 405.

For example, if the user states "I want to watch a show about penguins," and later states "I want a movie," the trees representing these two statements may be unified to produce a new tree, because a movie is a more specific form of show. This tree may be equivalent to the tree which would have resulted if the user initially stated "I want to watch a movie about penguins."

Rule 411 describes the process of concept replacement. There may be a first tree representing an earlier statement, containing relationship 414 between the root and entity 412, and relationship 415 between entity 412 and entity 413. A second tree may have relationship 417 between the root and entity 416. If relationship 415 and relationship 417 are both of the same relationship type, and entity 413 and entity 416 are both of the same entity type, then a new tree may be created in which entity 416 replaces entity 413, and the rest of the tree may remain unchanged.

For example, if the user states "I want to watch a movie about penguins," and later states "One about gorillas," the trees representing these two statements may be unified to produce a new tree. This can occur despite the second statement lacking a reference to movies, because "gorillas" and "penguins" may have the same relationship to other entities, as a subject matter indicator. The resulting tree may be equivalent to the tree which would have resulted if the user initially stated "I want to watch a movie about gorillas."

Rule 422 describes modifications in response to Boolean fragments. There may be a first tree representing an earlier statement, containing relationship 425 between the root and entity 423, and relationship 426 between entity 423 and entity 424. A second tree may have relationship 429 between the root and Boolean operator 427, which is acting on entity 428. If relationship 426 and relationship 429 are the same type, a new tree may be created in which that relationship type 434 now acts on a node representing the Boolean operator 431, which has children nodes 432 and 433.

For example, if the user states "I want to watch a movie about penguins." and later states "Or gorillas," the trees representing these two statements may be unified to produce a new tree. Because "gorillas" and "penguins" may be recognized as having the same relationship type to other entities when appearing in a query, both entities can be made children of the Boolean operator in the resulting tree. The resulting tree may be equivalent to the tree which would have resulted if the user initially stated "I want to watch a movie about penguins or gorillas."

The system may include even more complex rules for manipulation and combination of two distinct trees. An update rule may be expressed as a tuple comprising one or more of four elements.

First, an update rule may have a regular expression or other path-describing syntax which the first tree's structure must match before the rule will be applied. Path-describing syntax may comprise notation for describing nodes and edges, string values, sets or groups, or other expressions in the syntax. Path-describing syntax may also comprise operators which denote that an expression may optionally occur once (such as the traditional "?" in regular expressions), may optionally occur any number of times (such as the "*" in a regular expression, must occur once or more (such as the "+" in a regular expression), must occur at the root of the tree (such as the "^" in a regular expression), or must occur at a leaf of the tree (such as the "$" in a regular expression).

Second. an update rule may have, in addition or in contrast, a regular expression or other path-describing syntax which the second tree's structure must match before the rule will be applied.

Third, an update rule may have a constraint that will allow the rule to be applied only if some comparison between elements in the two trees to be manipulated or combined is true. For example, the constraint could be that the trees each contain a node representing elements in the same semantic group, such as gorillas and penguins in the previous example, or two forms or entertainment, or two actors, or two titles.

Fourth. an update rule must have a transformation rule, which may comprise a series of additions or deletions of nodes or branches of the tree, or unification of the trees by replacing a node in one tree with an entire branch of the other tree. For example, rule 422 could be expressed by a transformation rule which deletes node 424, adds node 427, re-adds node 424, and adds node 428 to add the Boolean expression to the first tree. In another example, rule 411 could be expressed by replacing node 413 with node 416 as well as any additional nodes which may be children of node 416.

As needs arise or more complex queries are intended for the system, a list of complex update rules within the system may be maintained or added to. These rules may be stored in a common format as a tuple of the four elements, and wherein any element not present in an update rule (such as a rule which lacks a constraint on the second tree's structure, or lacks a comparison constraint between trees) is represented as a null or empty set element.

Figure 5:
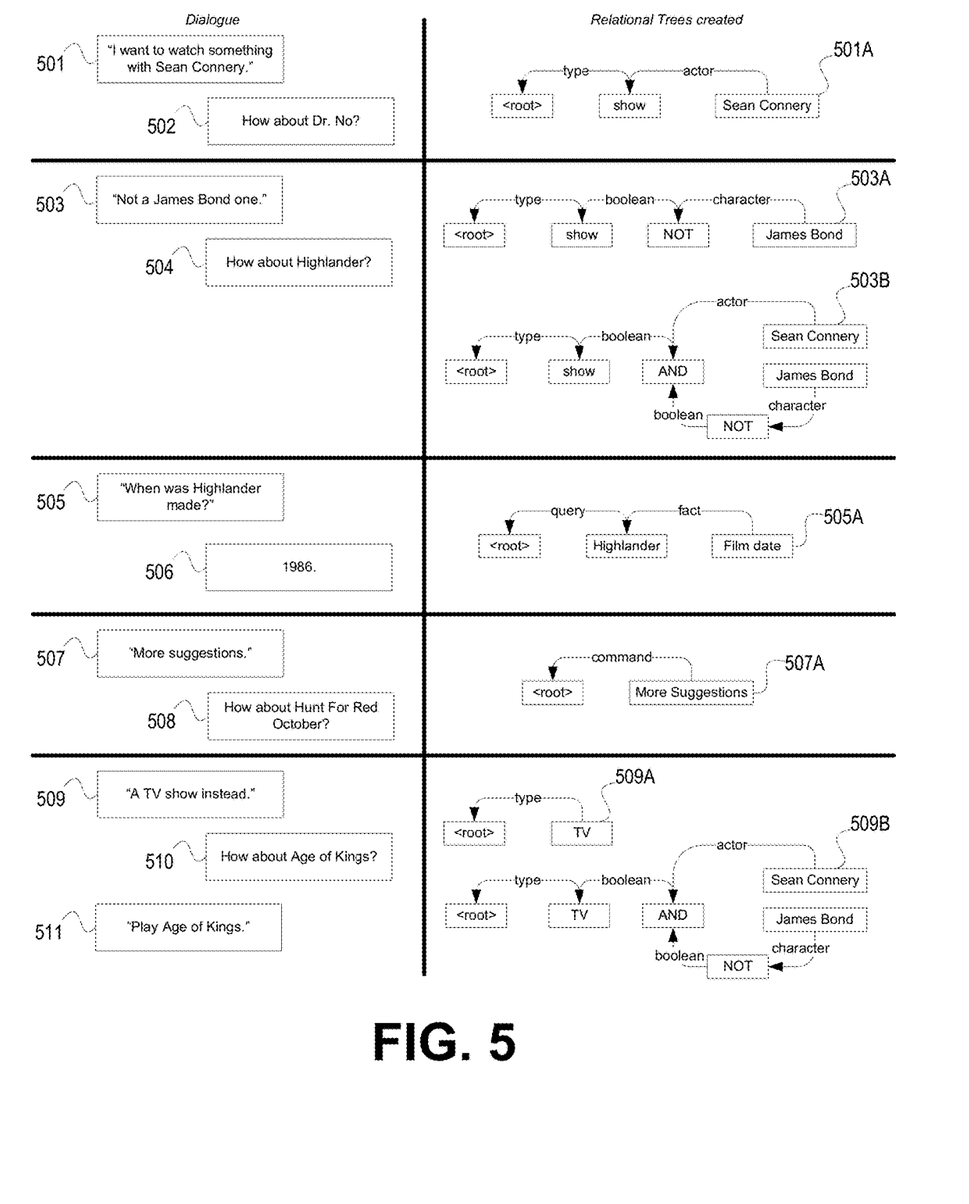
FIG. 5 shows an example dialog and a corresponding dialog state stored in memory at each point during the dialog.

FIG. 5 illustrates a possible dialog and a corresponding dialog state in memory for the duration of the dialog.

In step 501, the user indicates a desire to watch "something" "with" "Sean Connery." "Something" and "Sean Connery" are determined by the parser to be named entities. The generic placeholder "show" (which may comprise movies, TV shows, plays, etc.) is used as a node for "something." "With" and the name of an actor is transformed into a node corresponding to the actor, with a relationship to the "show" node of "actor." Tree 501A is generated as a result and placed on the stack.

In step 502, tree 501A is used to perform a query, and a number of results are found. One is selected and output to the user.

In step 503, the user makes a clarification, wishing to remove the set of James Bond movies from the results. The clarification is parsed to generate tree 503A, which is placed on the stack. Rule 422 is used to combine second-to-topmost tree 501A and topmost tree 503A from the stack into tree 503B, which now embodies all of the constraints the user wants to apply to the query. Tree 503A is discarded from the stack, and tree 501A is replaced by tree 503B.

In step 504, tree 503B is used to perform a query, and a number of results are found. One is selected and output to the user.

In step 505, the user has a query related to a result the system has returned. The query is parsed and tree 505A is generated and pushed onto the stack.

In step 506, the query is answered and tree 505A is removed from the stack.

In step 507, the user issues a command. The command is parsed and tree 507A is generated and pushed onto the stack.

In step 508, the system complies with the command by returning another suggestion. Tree 507A is removed from the stack.

In step 509, the user makes the clarification "A TV show instead." Rule 400 is used to unify tree 509A with tree 503B; tree 509A is removed from the stack and tree 503B is replaced by unified tree 509B.

In step 510, the system uses tree 509B to perform a query, outputting a result to the user.

In step 511, the user selects a result, terminating the dialog.

Although the examples in this disclosure have described uses applicable to a search mechanism for films or television shows, the method described is equally applicable in other fields of endeavor. For example, a user may search for a book to purchase from a bookstore or for an e-reader device. In this case, the system may search for results based on a relational tree of named entities such as authors, characters, titles, genres, merchants, prices, or best-seller status while responding to user queries and commands. A user may search for clothing to purchase at a department store or from an online merchant. In this case, the system may search for results based on a relational tree of named entities such as clothing type, designer, brand, material, size, color, pattern, cut, or price. A user may seek to perform legal research using a curated database of legal materials and filings. In this case, the system may search for results based on a relational tree of named entities such as case names, citations, keywords, parties, jurisdiction, author, case outcome, or date.

The use of relational trees generated from user statements for purposes of searching may be applied not only to the above examples, but to searches in any other domain in which possible results may be classified by named entities. Named entities may be members of closed sets (such as binary values, Boolean operators, or fixed lists of options) or of open sets (such as proper nouns, adjectives, numbers, dates).

Moreover, the present disclosure is not limited only to applications involving searches. Methods for tracking dialog state may be used in any application where a user carries on a dialog, regardless of whether a search is being performed. For example, a dialog consisting entirely of user commands and system acknowledgements may benefit from the use of dialog state tracking by using content from previous commands to resolve ambiguities in later commands.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving data representing a first user intent statement;
generating a first graph comprising two or more named entities identified within the first user intent statement and one or more relationships identified between the two or more named entities;
receiving data representing a second user intent statement;
without modifying the first graph, performing an action based on an intent identified in the second user intent statement; and
subsequent to performing the action based on the intent identified in the second user intent statement, performing an action based on an intent identified in the first user intent statement.

2. The method of claim 1, further comprising:
replacing a named entity within the first graph with a named entity within a third user intent statement.

3. The method of claim 1, further comprising:
adding a named entity to the first graph based on a third user intent statement;
identifying a relationship between the added named entity and another named entity within the first graph; and
adding the identified relationship to the first graph.

4. The method of claim 1, further comprising:
performing a query or command identified in a third user intent statement.

5. The method of claim 1, further comprising:
applying an update rule to the first graph based on an intent identified in a third user intent statement, the update rule comprising one or more additions, deletions, or replacements of nodes in the first graph, wherein applying the update rule is further based at least in part on contents of the first graph, contents of a second graph, or a comparison of an element in the first graph to an element in the second graph.

6. The method of claim 1, wherein the intent identified in the second user intent statement is identified by:
generating a second graph comprising two or more named entities identified within the second user intent statement and one or more relationships identified within the second user intent statement; and
determining that the second user intent statement is not related to the first user intent statement based on comparing the first graph with the second graph.

7. A system, comprising:
a processor; and
memory storing a database and storing computer readable instructions that, when executed by the processor, cause the system to:
receive data representing a first user intent statement;
generate a graph comprising two or more named entities identified in the first user intent statement and one or more relationships identified in the first user intent statement;
receive data representing a second user intent statement;

perform an action based on an intent identified in the second user intent statement, wherein the action comprises applying an update rule to the graph, the update rule comprising one or more deletions or replacements of nodes in the graph, wherein applying the update rule is based at least in part on contents of the graph, contents of a second graph, or a comparison of an element in the graph to an element in the second graph; and subsequent to performing the action based on the intent identified in the second user intent statement, perform an action based on an intent identified in the first user intent statement.

8. The system of claim 7, wherein performing the action based on the intent identified in the second user intent statement further comprises:

replacing a named entity within the graph with a named entity within the second user intent statement.

9. The system of claim 7, wherein performing the action based on the intent identified in the second user intent statement further comprises:

adding a named entity to the graph;
identifying a relationship between the added named entity and another named entity within the graph; and
adding the identified relationship to the graph.

10. The system of claim 7, wherein performing the action based on the intent identified in the second user intent statement further comprises:

performing a query upon the database based on relationships identified in the second user intent statement.

11. The system of claim 7, wherein performing the action based on the intent identified in the second user intent statement further comprises:

performing a command identified in the second user intent statement.

12. The system of claim 7, wherein the received data representing the first user intent statement comprises an audio recording of a user's spoken utterance.

13. The system of claim 12, additionally comprising a recording device, wherein the recording device records the user's spoken utterance and generates the received data representing the first user intent statement.

14. One or more non-transitory computer-readable media having instructions stored thereon, which when performed, cause a computing device to perform:

receiving data representing a first user intent statement;
identifying a plurality of named entities within the first user intent statement;
identifying one or more relationships between one or more pairs from the plurality of named entities;
generating a graph comprising two or more of the plurality of named entities and one or more of the identified one or more relationships;
receiving data representing a second user intent statement;
determining a classification of the second user intent statement wherein the classification indicates whether the second user intent statement is unrelated or related to the first user intent statement; and
performing an action based on the classification of the second user intent statement.

15. The non-transitory computer-readable media of claim 14, wherein performing the action based on the classification of the second user intent statement comprises:

replacing a named entity within the graph with a named entity within the second user intent statement.

16. The non-transitory computer-readable media of claim 14, wherein performing the action based on the classification of the second user intent statement comprises:

adding a named entity to the graph;
identifying a relationship between the added named entity and another named entity within the graph; and
adding the identified relationship to the graph.

17. The non-transitory computer-readable media of claim 14, wherein performing the action based on the classification of the second user intent statement comprises:

performing a query or command identified in the second user intent statement.

18. The non-transitory computer-readable media of claim 14, wherein performing the action based on the classification of the second user intent statement comprises:

applying an update rule to the graph, the update rule comprising one or more additions, deletions, or replacements of nodes in the graph, wherein applying the update rule is based at least in part on contents of the graph, contents of a second graph, or a comparison of an element in the graph to an element in a second graph.

19. The non-transitory computer-readable media of claim 14, wherein the received data representing the first user intent statement comprises an audio recording of a user's spoken utterance.

20. The non-transitory computer-readable media of claim 14 wherein the instructions further cause the computing device to perform:

subsequent to performing the action based on the classification of the second user intent statement, performing an action based on an intent identified in the first user intent statement.

* * * * *